March 5, 1929.  R. B. FAGEOL  1,704,315
CHILD'S SPRING VEHICLE
Filed Aug. 9, 1926
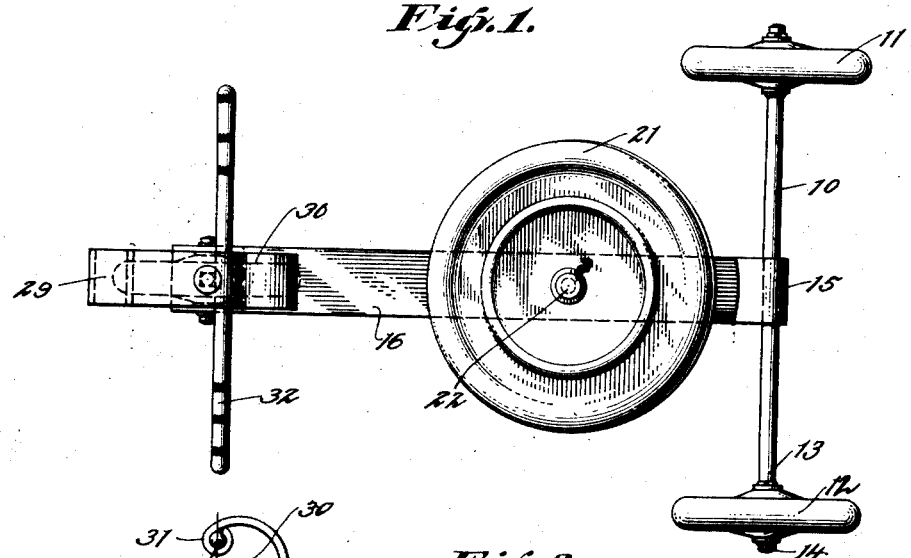
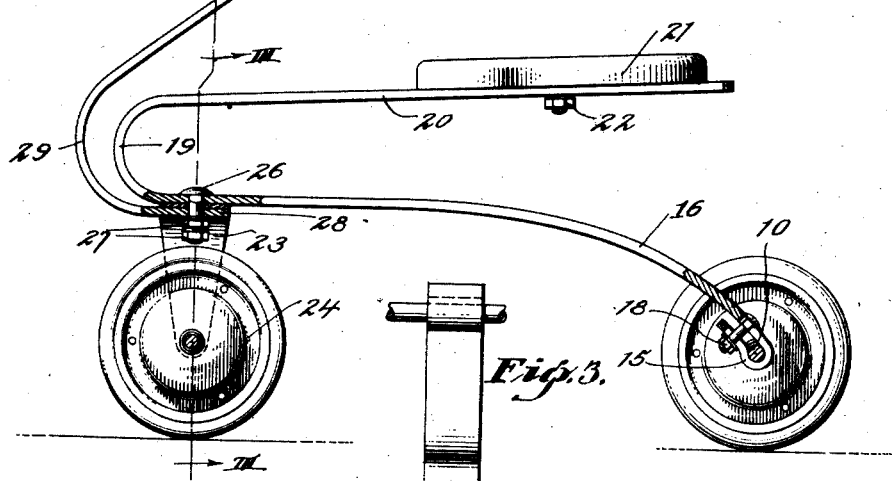
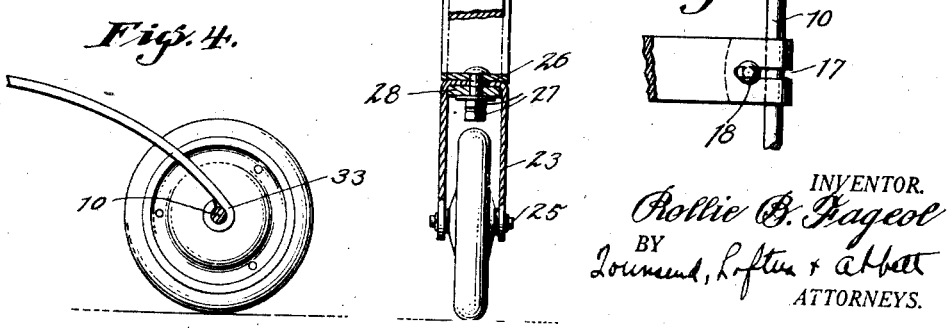
INVENTOR.
Rollie B. Fageol
BY
Townsend, Loftus & Abbott
ATTORNEYS.

Patented Mar. 5, 1929.

1,704,315

UNITED STATES PATENT OFFICE.

ROLLIE B. FAGEOL, OF LOS ANGELES, CALIFORNIA.

CHILD'S SPRING VEHICLE.

Application filed August 9, 1926. Serial No. 128,115.

This invention relates to a child's vehicle and particularly pertains to a vehicle of spring construction of the general type shown in a co-pending application filed by me March 8, 1926, entitled "Spring vehicle" and bearing the Serial Number 92,996.

It is the principal object of the present invention to provide a vehicle which may be used by children as an amusement device and which embodies the use of spring supporting means mounted upon a simple running gear which running gear may be readily manipulated to control the movement of the vehicle.

The present invention contemplates the use of a running gear having a front steering wheel and a pair of rear supporting wheels, said gear being secured to a spring body member and a resilient steering member, the device being otherwise fitted with a resilient seat support. The invention is illustrated by way of example in the accompanying drawings, in which—

Figure 1 is a view in plan showing the invention.

Figure 2 is a view in side elevation showing the vehicle with which the present invention is concerned.

Figure 3 is a view in vertical section through the steering wheel and its mounting, as seen on line 3—3 of Figure 2.

Figure 4 is a fragmentary view in side elevation showing a modified connection between the body member and the rear axle.

Figure 5 is a fragmentary view in plan disclosing the body and rear axle connection as shown in Figure 2 of the drawing.

Referring more particularly to the drawing—

10 indicates a rear axle. This axle is of suitable length to give the vehicle stability and to support it against lateral movement which would tend to overturn the vehicle.

Mounted upon the opposite ends of the axle are rear wheels 11 and 12 which are free to rotate and are held against inward sliding movement on the axle by shoulders 13 and outward movement by fastening members 14.

The rear axle is embraced and gripped at a point midway its length by a U-shaped bearing portion 15 formed as a continuation of the end of the body bar 16 of the vehicle. The U-shaped portion 15 is slotted as indicated at 17 to accommodate a clamping bolt 18. The square shoulders of this bolt fit into the upper part of the slot and the main body of the bolt passes down through the lower terminating end of the bar. By this simple expedient the bolt will be held against rotation and may be securely tightened to cause the U-shaped clamping portion 15 to positively grip the axle 10 and to prevent it rotating or having movement longitudinally of its axis. The body bar 16 is formed of spring material and extends upwardly and forwardly from the axle 10 in a long sweeping curve. The forward end of the body bar as here shown is bent upon itself to form a loop 19, the bar then continuing in a horizontal plane to provide a resilient support 20, upon which a seat 21 is secured by a bolt 22. At a point directly in the rear of the loop 19 the body bar 16 is supported by the fork 23 of front steering wheel 24. This fork extends downwardly along opposite sides of the wheel 24, and receives a bolt 25 which passes through the hub of the wheel 24 as well as through openings in the arms of the fork 23. As more clearly shown in Figure 3 of the drawings, the horizontal portion of the fork is flat and connects with the side arms in a substantially square bend. The upper face of the fork rests against the under flat face of the body bar 16. This face is perforated to receive a king bolt 26 which extends downwardly through openings in the body bar 16 and the fork, and is held in position by lock nuts 27.

Disposed between the side arms of the fork 23 is a steering bar 28. This bar is of a width to fit snugly between the arms of the fork and to be thus held by the king bolt 26 and its nuts 27. The steering bar 28 extends forwardly and is then recurved over the loop 19 of the seat support, as indicated at 29. The upper end of the steering bar may be arranged as desired, although in the present instance it is scrolled as indicated at 30 and terminates in an eye 31, which receives handle bars 32. The handle bars are made of a straight piece of metal as shown in Figure 1 of the drawing, and by which the vehicle may be steered.

It will be understood that in some instances it may be found desirable to eliminate the fastening for the rear axle as shown in Figure 2 of the drawing and to adopt in Figure 33 which will embrace and grip the axle 10 as shown in Figure 4 of the drawing. It will thus be seen that in the present structure a strong resilient body member 16 is provided and is supported by a running gear comprising a single front steering wheel and a pair of rear wheels, the body bar being curved rearwardly and downwardly to give a slight truss effect and to thus add strength and some rigidity to the structure.

It will be further noted that the seat 21 is resiliently supported upon a spring supporting bar 20, and that in addition thereto a resilient steering bar is provided which not only makes the device comfortable for the child riding the same, but also affords considerable enjoyment and amusement in manipulating the vehicle and in setting its various spring elements in motion.

While I have shown the preferred form of my invention, it will be understood that various changes in the combination, construction and arrangement of parts may be made by those skilled in the art without departing from the spirit of the invention as claimed.

Having thus described my invention, what I claim and desire to secure by Letters Patent is—

1. A device of the character described, comprising a rear axle, wheels mounted upon the opposite ends thereof, a front axle, a wheel mounted thereon, a wheel fork engaging the front axle on opposite sides of its wheel, a spring bar secured to the rear axle, intermediate its ends and supported by the fork at its forward end, a king bolt pivotally connecting the fork with said spring bar, and a steering member connected with the fork and by which the fork may be rotated around the king bolt, a seat for the vehicle, and a spring supporting bar for said seat attached to the vehicle structure at a point adjacent the axle fork and adapted to extend rearwardly to form a cantilever spring support for the seat.

2. A device of the character described, comprising a rear axle, wheels mounted upon the opposite ends thereof, a front axle, a wheel mounted thereon, a fork engaging the opposite ends of the front axle, a body structure comprising a spring bar bent upon itself to provide upper and lower leaves disposed in a vertical plane with the loop portion thereof extending forwardly over the fork, means for securing the rear axle to the end of said lowermost leaf of the spring bar, means for pivotally securing the forward end of said lowermost leaf upon the axle fork, a seat carried upon the free end of the upper leaf of the spring bar, and means for turning the front steering wheel to steer the vehicle.

3. A device of the character described, comprising a rear axle, wheels mounted upon the opposite ends thereof, a front axle, a wheel carried thereby, a front wheel fork extending along opposite sides of the front wheel and engaging the front axle, said fork extending vertically, a body structure for the vehicle comprising an arcuate spring bar supported upon the fork at its forward end, and being deflected downwardly and rearwardly to the rear axle, means for fastening said bar to the rear axle at a point intermediate the ends of said axle, a king bolt passing downwardly through an opening in the bar at its forward end and through the axle fork, whereby the fork may rotate around the vertical axis of said bolt, a seat bar formed as a continuation of said body bar, said seat bar extending forwardly of the king pin and being bent in a loop to extend rearwardly and substantially horizontally, a seat mounted upon the free end of said bar and upon which a person may sit while astride the body structure of the vehicle, and a tongue member extending between the arms of the fork and secured with relation thereto by the king bolt whereby the vehicle may be guided.

4. A device of the character described comprising a rear axle, wheels mounted upon the opposite ends thereof, a front axle, a wheel mounted thereon, a steering fork, the arms of which extend downwardly along opposite sides of the front wheel and engage the front axle, a body member resting upon the top of the fork and extending rearwardly and downwardly to the rear axle, said body member being formed of spring material, means for attaching the body member to the rear axle at a point intermediate the ends of the rear axle, a steering tongue extending forwardly from a point between the arms of the fork and fitting therebetween, and a king bolt extending vertically through the body bar, the fork and the steering tongue whereby the steering tongue and fork will be held rigidly with relation to each other and may swing around a vertical pivot with relation to the body bar.

5. A device of the character described, comprising a front wheel, an axle therefor, an axle fork having arms which extend downwardly along opposite sides of said wheel, and engage the axle, a rear axle of relatively long length as compared with the front axle, a wheel mounted on each end of said axle, a spring body bar extending rearwardly and downwardly from a point above the front axle fork to the rear axle, said body bar being looped at its rear end to embrace the rear axle at a point intermediate its ends, a bolt for clamping the loop around the axle in a manner to hold the same, a spring bar formed as a continuation of said body bar and bent upwardly and rearwardly upon the body bar in the same vertical plane therewith, a seat mounted upon the free end of said spring bar extension for supporting a person sitting astride the looped spring bar structure, a tongue bar fitting between the arms of the front axle fork, a king bolt extending downwardly through an opening in the body bar and fixed against rotation therein, said bolt also passing through openings in the fork and tongue bar whereby said fork and tongue may move in unison around the bolt, the tongue extending upwardly and rearwardly and terminating in handle bars by which it and the fork may be rotated around a vertical axis.

6. A device of the character described, comprising a rear axle, wheels mounted upon the opposite ends thereof, a front axle, a wheel mounted thereon, a wheel fork engaging the front axle, a body member comprising a resilient bar bent upon itself to form upper and lower arms each having free ends, means connecting the rear axle with the free end of the lower of said body arms, a seat carried upon the free end of the upper of said body arms, means pivotally connecting said body member with the fork for horizontal swinging movement, and a steering member connected with the fork.

7. A device of the character described, comprising a rear axle, wheels mounted thereon, a front axle, a wheel mounted thereon, a wheel fork engaging the front axle, a body member formed of flat stock resilient material bent upon itself to provide an upper leaf and a lower leaf, means connecting the rear axle to the lower leaf, a seat mounted upon the upper leaf, means pivotally connecting the axle fork with the body structure thus formed, and a steering member connected with the axle fork.

8. A device of the character described, comprising a rear axle, wheels mounted thereon, a front axle, a wheel mounted thereon, a wheel fork engaging the front axle, a body member formed of flat resilient material and being connected at one end to the rear axle, and being recurved to form a resilient seat support, a seat carried thereon, a steering member disposed between arms of the fork and a king bolt passing through said steering member, the fork and the body member, to provide a pivotal mounting for the front axle.

ROLLIE B. FAGEOL.